United States Patent [19]

Small

[11] Patent Number: 4,717,833
[45] Date of Patent: Jan. 5, 1988

[54] SINGLE WIRE CURRENT SHARE PARALLELING OF POWER SUPPLIES

[75] Inventor: Kenneth T. Small, Cupertino, Calif.

[73] Assignee: Boschert Inc., Milpitas, Calif.

[21] Appl. No.: 865,318

[22] Filed: May 19, 1986

Related U.S. Application Data

[63] Continuation of Ser. No. 605,503, Apr. 30, 1984, Pat. No. 4,609,828.

[51] Int. Cl.⁴ .............................................. H02J 3/46
[52] U.S. Cl. ...................................... 307/44; 307/53; 307/64; 363/25; 363/71
[58] Field of Search .................. 307/18, 28, 34, 35, 307/38, 39, 40, 41, 42, 43, 48, 52, 53, 54, 60, 61, 63, 64, 66, 85, 86, 87, 25, 44; 363/26, 28, 49, 50, 69, 72, 71, 70, 74, 79, 80, 97, 100, 21, 56; 323/269, 271, 272, 275, 276, 280, 281, 282, 285, 287, 284, 901

[56] References Cited

U.S. PATENT DOCUMENTS

| | | | |
|---|---|---|---|
| 3,769,568 | 10/1973 | Hamilton et al. | 363/25 |
| 3,824,450 | 7/1974 | Johnson et al. | 323/272 |
| 4,038,594 | 7/1977 | Quinn et al. | 323/280 |
| 4,150,424 | 4/1979 | Nuechterlein | 363/56 X |
| 4,177,389 | 12/1979 | Schott | 307/64 |
| 4,263,643 | 4/1981 | Koike | 363/19 |
| 4,272,805 | 6/1981 | Iguchi et al. | 363/19 |
| 4,272,816 | 6/1981 | Matsumoto | 363/74 X |
| 4,302,802 | 11/1981 | Hyde et al | 363/21 |
| 4,326,245 | 4/1982 | Saleh | 363/79 |
| 4,327,404 | 4/1982 | Horiguchi | 363/19 |
| 4,415,960 | 11/1983 | Clark | 363/21 |
| 4,425,613 | 1/1984 | Shelly | 363/26 |
| 4,437,146 | 3/1984 | Carpenter | 363/21 |
| 4,476,399 | 10/1984 | Yoshida et al. | 307/64 X |
| 4,488,057 | 12/1984 | Clarke | 307/66 |
| 4,546,421 | 10/1985 | Bello et al. | 363/97 X |

Primary Examiner—William M. Shoop, Jr.
Assistant Examiner—Paul Ip
Attorney, Agent, or Firm—Kenneth E. Leeds; Alan H. MacPherson; Paul J. Winters

[57] ABSTRACT

Each of a plurality of parallel connected power supplies is controlled by a parallel control circuit which measures the output current from each power supply and compares this output current to the average output current produced by all the power supplies and generates a signal representative of the difference therebetween to drive the output current of the power supply toward the average output curent from all power supplies. The structure includes in addition a switch for disconnecting the parallel control circuit of a failed power supply from the system and a booster resistor for assisting in bootstrapping the startup of a given power supply being inserted into parallel with the preexisting parallel connected power supplies.

10 Claims, 7 Drawing Figures

SINGLE WIRE CURRENT SHARE PARALLELING OF POWER SUPPLIES

This application is a continuation of application Ser. No. 605,503, now U.S. Pat. No. 4,609,828 filed 4/30/84.

BACKGROUND OF THE INVENTION

1. Field of the Invention

This invention relates to a parallel connected power supply consisting of at least two independent supplies implemented using single wire current sharing and, in particular, to the connection of at least two power supplies in parallel in such a manner as to provide redundancy or higher output capability for the parallel-connected supplies.

2. Prior Art

As described in an article by Reeves and Mehta, published in *Electronic Products*, Sept. 7, 1982, on pages 106 to 108, and entitled, "Minimizing the Effects of Power Supply Failure", a number of ways exist for achieving redundancy in power supplies. A redundant power supply consists of at least two independent supplies, each of which can carry the entire load, connected in parallel. If one supply fails, the other maintains the system's operation. As described by Reeves and Mehta, a number of different approaches are commonly used to achieve redundancy. One common approach involves the use of a "master-slave" system, in which a master supply controls the operation of one or more slave systems. While each supply delivers an equal share of the total load current, should a master fail then the entire system fails defeating the purpose of a redundant supply. However, because each supply is operating well below its rated capacity, the probability of failure of a particular supply is less than when the supply is operated at its maximum capacity.

A second approach uses an external load sharing or current balancing module. Output cables from each supply are connected to the module and a single pair of cables connects the module to the supply bus. Control circuitry within the module feeds signals back to the supplies commanding them to share load current equally. Each supply achieves a longer life because it is operated beneath its maximum output. However, the control module must be built to accommodate the number of parallel supplies. Should additional supplies be added to the system in the field the control module must be replaced.

A third approach consists of the direct paralleling of two or more supplies. If the load demands more current from a supply than a preadjusted fold back limit, internal circuitry automatically reduces or folds back the output current of one of the supplies to a percentage of its rated output. At this point the second supply begins to deliver power. Using this technique, any number of supplies can be connected together. No external control circuitry or module is required. However, current is not shared equally among the supplies so one or more supplies are under greater stress and thus are more likely to fail than the other supplies.

A fourth technique is known as "single wire current sharing". This technique provides the benefits of direct paralleling plus an equal distribution of current among the parallel supplies. In the single wire system, each supply contains special load current sensing and control circuitry and transmits information about output current to other supplies in the system via a single wire communications loop. The control circuitry in each supply adjusts the output current to equal that being supplied by the other units in the system. As a result, load current is shared equally by all the supplies. The major disadvantage to the single wire approach is that the supplies used must have the required special internal control circuitry.

Thus in summary, the use of a number of power supplies in parallel to increase reliability and provide more total output current is common. If extra current capability is provided, one or more supplies can fail without causing an output voltage failure. The good supplies "pick up" the extra load. The paralleling of supplies increases reliability by decreasing the operation of the supplies at their maximum rated levels. By paralleling supplies in a manner to insure equal load sharing, each supply operates at a reduced load. This increases the reliability of each supply by lowering its operating temperature and increasing its life. All paralleling methods except simple direct paralleling provide equally shared load current. The failure of simple direct paralleling to do so makes this technique unacceptable for most applications. The disadvantage of a master-slave paralleling system is that if the master fails the entire system shuts down. In addition, the master is usually different from the slaves and cannot always be interchanged with the slaves. This makes the system more complex than a system utilizing simple, interchangable supplies with no external circuitry. Another problem with parallel wire redundancy circuits is that the interconnecting paralleling wire might pick up external noise. Unless the paralleling circuit filters this noise, it will not be immune to this noise. This precludes many possible circuits lacking the appropriate filters from being practical. In addition, short circuiting of the parallel bus will disable the system and prior art systems also exhibit stability problems. The direct coupling of "error" signals from several supplies is similarly impractical.

In view of the above, the single wire direct paralleling approach is preferred.

SUMMARY OF THE INVENTION

This invention provides a control circuit for converting an ordinary power supply to one suitable for use in parallel with other similarly converted supplies which:

1. works with either voltage-controlled current mode or conventional voltage mode power supplies and may be added to almost any supply;
2. allows a given power supply to be used alone or in a parallel configuration with one or more other supplies without any change in hardware;
3. limits output voltage from each parallel-connected supply to an acceptable change, such as 50 millivolts, with no adverse effect if the parallel wire is grounded thereby preventing one defective supply from causing failure of other supplies to support the load;
4. provides a paralleling wire which is immune to noise pick-up;
5. has a minimal cost and complexity so that the supply can be standard in every system;
6. has improved stability characteristics;
7. provides accurate current sharing; and
8. is energy efficient.

This invention will be more fully understood in accordance with the following detailed description taken together with the drawings.

DETAILED DESCRIPTION

While several embodiments of this invention will be described, the following description is meant to be illustrative only and not limiting.

Figure 1:
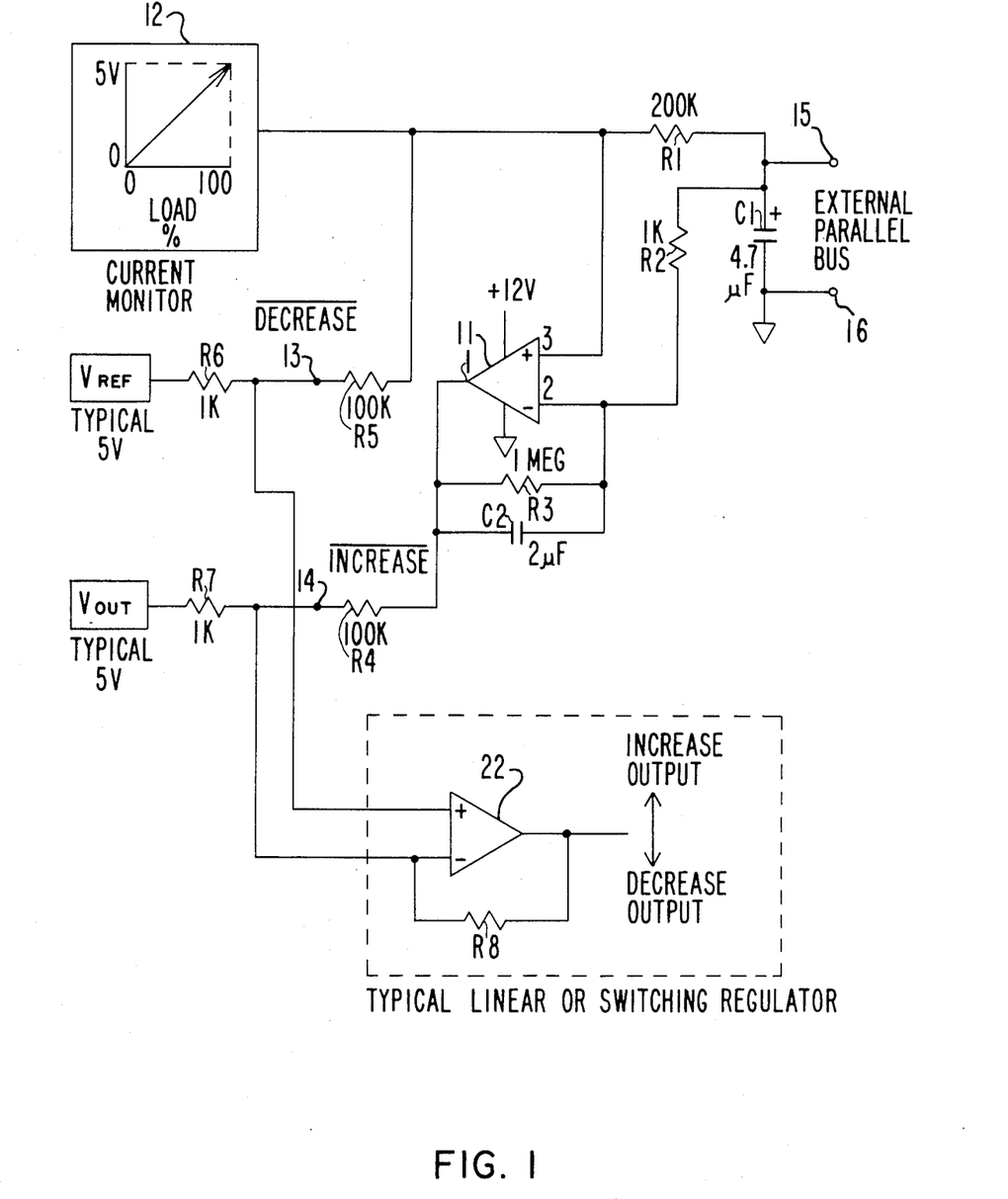
FIG. 1 illustrates the parallel control circuit of this invention suitable for use to control the output current of a power supply used in parallel with other power supplies.

FIG. 1 shows the basic parallel control circuit of this invention for use with a power supply either used singly or in parallel with other power supplies. As will be seen from the following description, the parallel control circuit of this invention insures that each power supply will receive a control signal for adjusting its output current to be substantially equal to the average of the output currents of all the parallel connected power supplies while at the same time, prevent drastic change in the operation of the power supply to which the parallel control circuit of FIG. 1 is connected should the single parallel wire 15 to which the parallel control circuit is connected be accidently grounded or disconnected.

As shown in FIG. 1, the parallel control circuit senses the DC voltage level generated by the current monitor circuit 12 (not shown in detail but of well-known design) monitoring the output current of the particular power supply to which the parallel control circuit is connected. This DC voltage level is proportional to and representative of the current being supplied by the power supply being monitored. Should the current monitor circuit 12 produce an output signal of zero volts, then no load current is being demanded from the particular power supply to which the parallel control circuit of FIG. 1 is connected. Should the current monitor circuit 12 produce an output signal of five volts then full load current is being demanded from this power supply. The zero and five volt limits are arbitrary and other limits could, if desired, be selected. Naturally, in ordinary operation, less than full load current is being produced so the current monitor circuit 12 will produce a voltage somewhere between zero and five volts. The DC voltage from the current monitor circuit 12 representing the load current produced by the power supply is applied to the positive input lead 3 to amplifier 11. With respect to signals on positive input lead 3, amplifier 11 operates in a unity gain (follower) fashion. Thus equal signals (i.e. signals equal in amplitude and of the same sign) are passed to the increase and decrease output leads 13 and 14 respectively from the parallel control circuit of FIG. 1 in response to any change in the output voltage from current monitor 12. Therefore any change of the output voltage from current monitor 12 reflecting a change in load current from the power supply to which the parallel control circuit of FIG. 1 is connected will result in the output signal from amplifier 22 (part of the power supply being regulated) changing to maintain $V_{out}$ from power supply equal to $V_{ref}$. Thus the parallel control circuit of FIG. 1 is suitable for use on a power supply being used singly. In this configuration the parallel control circuit has no effect on the current or voltage produced by the power supply to which it is connected.

However, should the power supply to which the parallel control circuit is connected be used in parallel with other power supplies, any deviation of the output current of this power supply from the average output current of all parallel-connected power supplies will cause a voltage to appear across the resistor R1 (200K ohms). Because the difference in load currents is sensed at node 15 and is applied through resistor R2 (1K ohms) to the negative input lead 2 of amplifier 11 possessing feedback resistor R3 (1 megohm) connected from the output lead 1 of amplifier 11 to negative input lead 2, amplifier 11 will amplify this voltage by 1,000 (the ratio of R3 to R2). This causes the output voltage on terminal 14 to change by up to 50 millivolts or by whatever voltage less than 50 millivolts is needed to equalize the output current from the power supply to which the parallel control circuit of FIG. 1 is connected to the average output currents from all power supplies (not shown in FIG. 1) connected in parallel. The decrease and increase connections 13 and 14, respectively, are connected to terminals on the error amplified 22 of the power supply to which the parallel control circuit of FIG. 1 is connected. Sinking or sourcing current through terminal 13 will slightly alter the output voltage of the power supply to which the parallel control circuit of FIG. 1 is connected by slightly offsetting the reference voltage $V_{ref}$ that determines the output voltage $V_{out}$. Connections 13 and 14 are also known as "margin" ports because they are available to the user of the power supply to remotely vary the output voltage $V_{out}$ of the power supply to check the operating voltage margins of the entire system in which the power supply is used. In general, power supplies will accept the increase and decrease signals provided on terminals 13 and 14 by the control circuit of this invention.

A word is in order on the nomenclature associated with terminals 13 and 14 in FIG. 1. Terminal 13 is denoted as the "decrease connection" while terminal 14 is noted as the increase connection". This nomenclature is selected because a negative voltage on terminal 13 will decrease the output voltage of the power supply while a negative voltage on terminal 14 will increase the output voltage from the power supply. Terminal 13 is connected as shown into the power supply so as to pull down on the reference voltage in the power supply through resistor R6 (1K ohm).

Lead 14 is connected to the feedback voltage divider (consisting of resistor R7 (1K ohm) and resistor R4 (100K ohms)) in the power supply so as to pull down on the divider in the feedback path and thereby increase the output voltage from the power supply.

If the parallel wire connected to node 15 is accidently shunted to ground 16, amplifier 11 will saturate at about +10 volts output. The values of resistors R4 and R5 (100K ohms each) were chosen to limit the change in output voltage from amplifier 11 to a maximum of 50 millivolts for a zero volt no load to 5 volt full load output current from the output current monitor circuit 12. This 50 millivolts is also the "capture range" of the circuit when the circuit is used to control several supplies connected in parallel.

The parallel wire interface terminal 15 is bypassed to ground by capacitor C1 (4.7 microfarads). This capacitor shunts high frequency noise to ground and thus the circuit is immune to such noise picked up on the parallel wire. Only slowly changing balance signal information is passed along the interface wire 15. However, fast transient response in each individual power supply is maintained because resistor R3 is shunted by capacitor C2 (about 2 microfarads). This causes amplifier 11 to act as a follower of fast signals and present equal (cancelling) signals to the increase and decrease connections connected to terminals 13 and 14. The circuit thus has no net effect on and causes no change in the output voltage $V_{out}$ from the power supply to which it is connected from a rapid change in load current.

In the structure of FIG. 1, when the input voltage on terminal 15 is shorted to ground 16 indicating that the single parallel wire interconnect has been grounded, the amplifier 11 goes to its maximum 50 millivolt output thereby increasing the voltage on terminal 14. The signal on terminal 14 is sent to the increase connection on the power supply thereby to decrease the output voltage from the power supply. (Of course the output voltage on lead 14 could be controlled to any other maximum value desired depending upon design considerations.)

Figure 4:
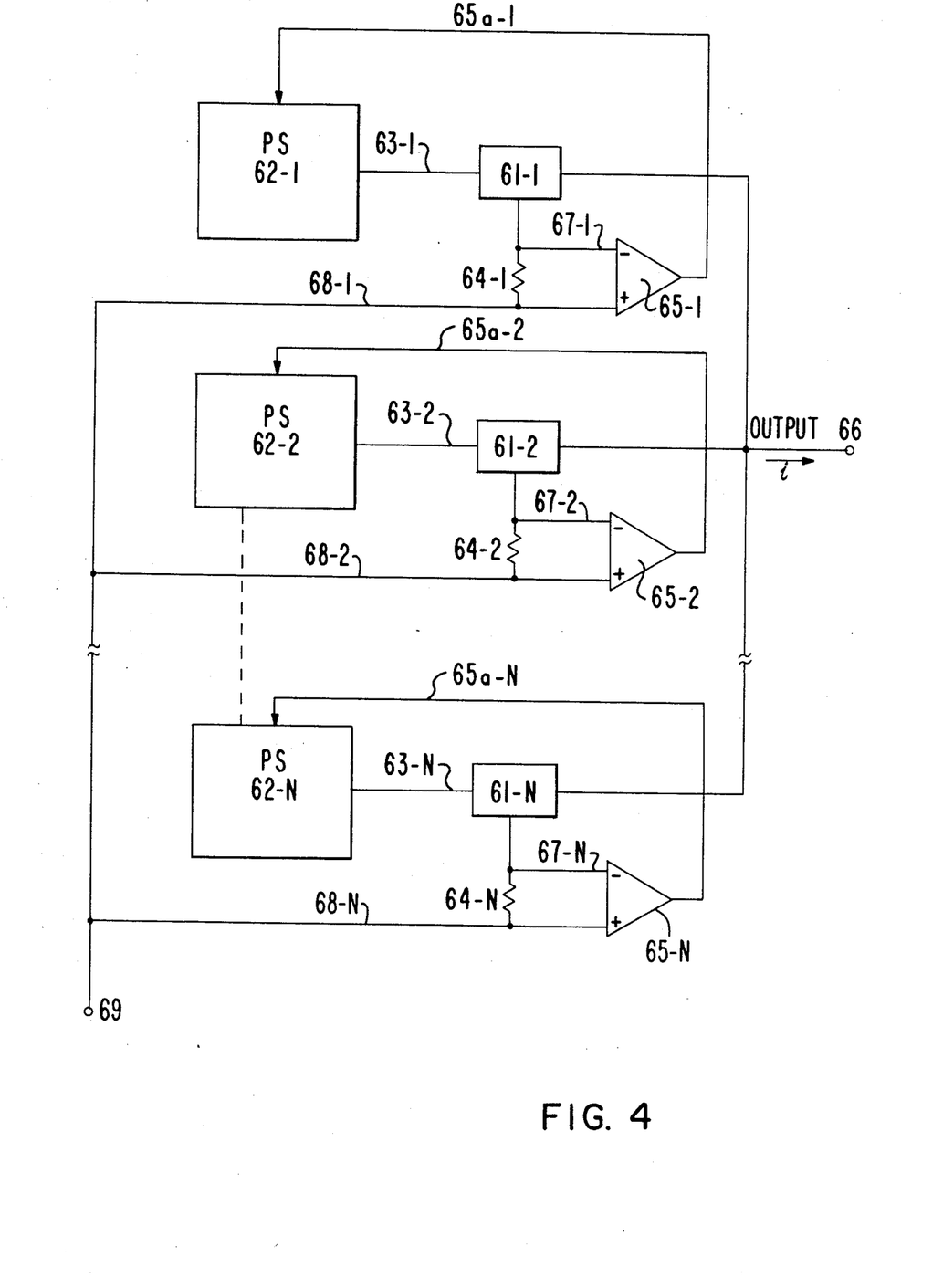
FIG. 4 illustrates a parallel connected power supply system incorporating the parallel control circuit of this invention.

Turning now to FIG. 4, a basic parallel-connected power supply incorporating N individual power supplies (where N is a selected integer representing the maximum number of parallel-connected power supplies) controlled in accordance with the parallel control circuitry of this invention is illustrated. In FIG. 4, each of power supplies 62-1 through 62-N produces output current on the corresponding one of output leads 63-1 through 63-N. The output current on each lead represents a portion of the total current required on output lead 66 which supplies the output current to the system being powered by the parallel-connected power supplies 62. Generally the current i on lead 66 is drawn by a load. The power supplies 62 operate such that the output voltage on lead 66 is within a voltage given by $V \pm \epsilon$ where $\epsilon$ equals some maximum acceptable error in the output voltage on lead 66. The magnitude of the current i on lead 66 can vary over a wide range from zero to some maximum value depending on the needs of the system being powered. For example, if the system being powered is a computer the output current required on lead 66 may vary from a very low level to a substantially higher level. Each power supply 62-1 through 62-N will produce a substantially equal portion of the current on output lead 66. The output current from each power supply 62-n is transmitted on the corresponding output lead 63-n (where n is an integer given by $1 \leq n \leq N$) through a corresponding current sensor 61-n where a voltage proportional to the output current of power supply 62-n is generated in any one of a number of known ways. A typical and commonly used method of generating this voltage is to pass the output current through a very low resistance, measure the voltage drop across this low resistance and amplify this voltage. The resistance is a resistance added to some portion of the power supply system. The voltage generated by each of current-to-voltage generators 61-1 through 61-N is then transmitted to one input lead of an amplifier 65-1 through 65-N. Each of these amplifiers is identical in structure and operation and thus only one of these amplifiers will be described. For example, amplifier 65-1 receives an input signal on the negative input lead 67-1 representative of the voltage generated in the current-to-voltage generator 61-1 and receives on the positive input lead 68-1 a voltage representative of the average output current produced by all of the N power supplies 62. This voltage is generated merely by connecting together at node 69 the positive input leads of each of amplifiers 65-1 through 65-N. The voltage on node 69 reflects the average current produced by each power supply 61-1 through 62-N. The current through and voltage drop across error resistor 64-1 represents the difference between the voltage on input lead 67-1 representative of the output current from power supply 62-1 on lead 63-1 and a voltage on lead 68-1 representative of the average output current produced by all of the power supplies 62 in the parallel-connected system. Thus if the output current produced on output lead 63-1 is lower than it should be compared to the average output current i/N produced by all of the power supplies 62 in the system, amplifier 65-1 produces an output signal which is transmitted on feedback lead 65a-1 to the control circuit (of a well known design) within power supply 62-1 to control power supply 62-1 to increase its output current. Typically this is done by changing a reference voltage within power supply 62-1 so as to increase the duty cycle of the output waveform within the power supply 62-1 if it is a switching power supply. Should the output current of power supply 62-1 be greater than the average output current from all power supplies, amplifier 65-1 produces an output signal which decreases the output current from power supply 62-1. The other parallel control circuits work in precisely the same manner so that each power supply 62-1 through 62-N produces an output current which is controlled to conform to the average output current produced by power supplies 62-1 through 62-N.

Figure 2:
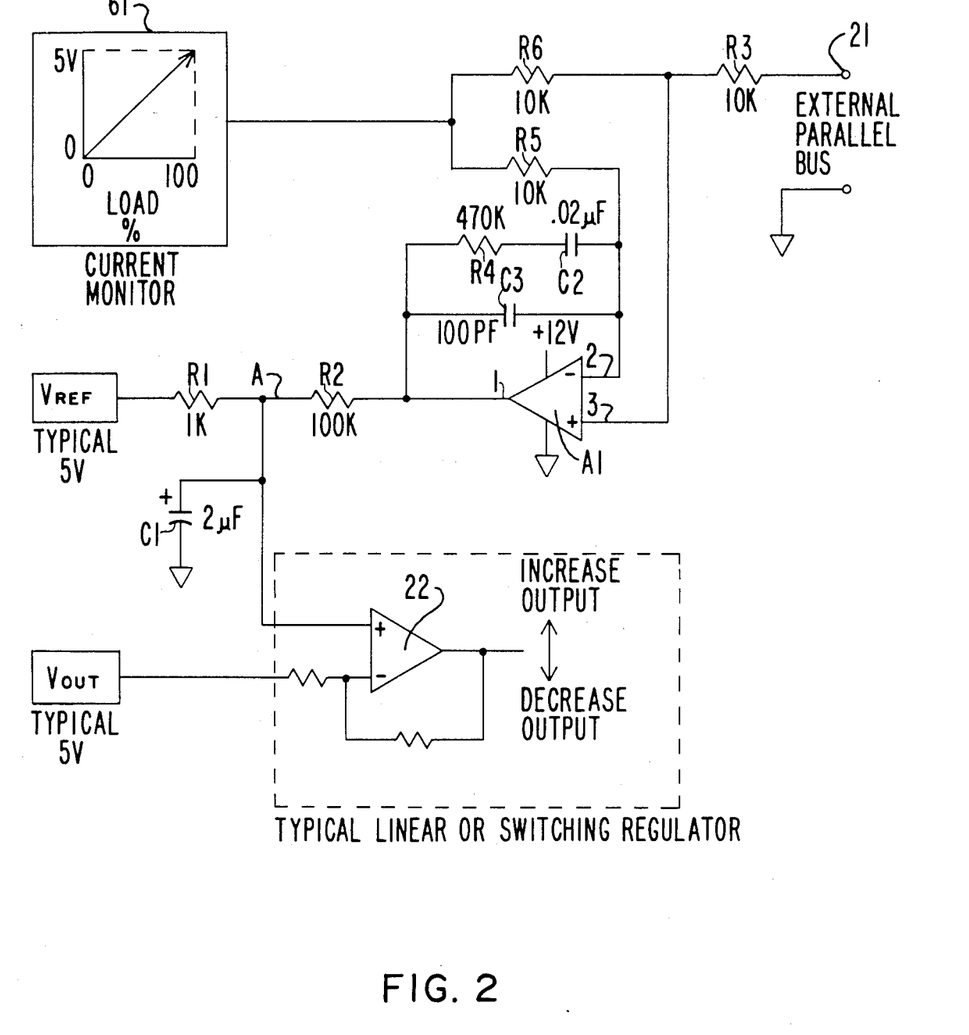
FIG. 2 illustrates an alternative basic parallel control circuit in accordance with this invention.

Another embodiment of the parallel control circuitry of this invention is shown in more detail in FIG. 2. In FIG. 2, amplifier A1 corresponds to amplifier 65-1 shown in FIG. 4. Error resistor 64-1 in FIG. 4 corresponds to resistor R6 (10K ohms) in FIG. 2. Amplifier A1 is shown with a feedback network connected from the output lead 1 to the negative input lead 2. This feedback circuit comprises the parallel connected capacitor C3 (100 picofarads) in parallel with the series connected resistor R4 (470K ohms) and capacitor C2 (0.02 microfarads). This network, as is well known, provides a flat response for the output signal from the amplifier as a function of frequency over a selected range of frequencies. The current monitor signal generator 61 is shown as capable of producing an output voltage (shown as 0 V to 5 V) over the range of output or "load" currents (0 to 100%) expected from the power supply. The output voltage from current monitor 61 is linearly related to the input current. For zero current the output voltage is also zero. This output voltage is applied to error resistor R6 (corresponding to resistor 64-1 in FIG. 4).

The output signal from amplifier A1 is passed through output resistor R2 (100K ohms) and then directly to one terminal of series connected resistor R1 (1K ohms), the other terminal of which is connected to reference voltage $V_{ref}$ internal to the power supply. Resistors R1 and R2 comprise a voltage divider. The voltage on node A is determined by the voltage on the output lead of amplifier A1, the values of resistors R1 and R2, and $V_{ref}$. In the embodiment shown, the values of R1 and R2 are arbitrarily selected so that the voltage on the node A between resistors R1 and R2 changes by 1% of the change in the output voltage from amplifier A1. The one percent (1%) value is chosen so that the maximum change in the output voltage from amplifier A1 will not be so large as to create a system malfunction but will be large enough to capture drift and tolerance at variations within the system. A change in the voltage on node A (FIG. 2) changes the reference voltage in the typical regulator circuit (not shown) which controls the output voltage of the power supply 62-1 (FIG. 4). If this power supply is a switching power supply, then the change in the voltage on node A (FIG. 2) will change the duty cycle of the power supply to drive the power supply to change the output voltage by 1%. The output voltage $V_{out}$ (which is typically 5 volts) must follow the change in the reference voltage and thus the output voltage $V_{out}$ from the controlled power supply is regulated.

Should the external parallel bus (shown in FIG. 2 as element 21) fail and become short circuited to ground, the input signal on the positive input lead of amplifier A1 goes to a very low voltage thereby driving the output signal of amplifier A1 to its maximum negative value. The reference voltage $V_{ref}$ to regulator circuit amplifier 22 (located in the power supply being controlled) thereby goes at a maximum to 2% less than its former value of $V_{REF}$ assuming the former value of $V_{REF}$ was its maximum value. The power supply therefore continues to operate satisfactorily although at a lower output voltage. Should the external parallel bus 21 become disconnected, the voltage on this bus will be undefined. In this circumstance, the output voltage from amplifier A1 can go in either direction thereby ensuring that the output signal from amplifier A1 will still not vary by any more than ±1% in the worst possible case.

Resistor R3 is an isolating resistor to prevent an external connection from being made directly to input lead 3 of amplifier A1. Thus resistor R3 serves to protect amplifier A1.

Figure 3:
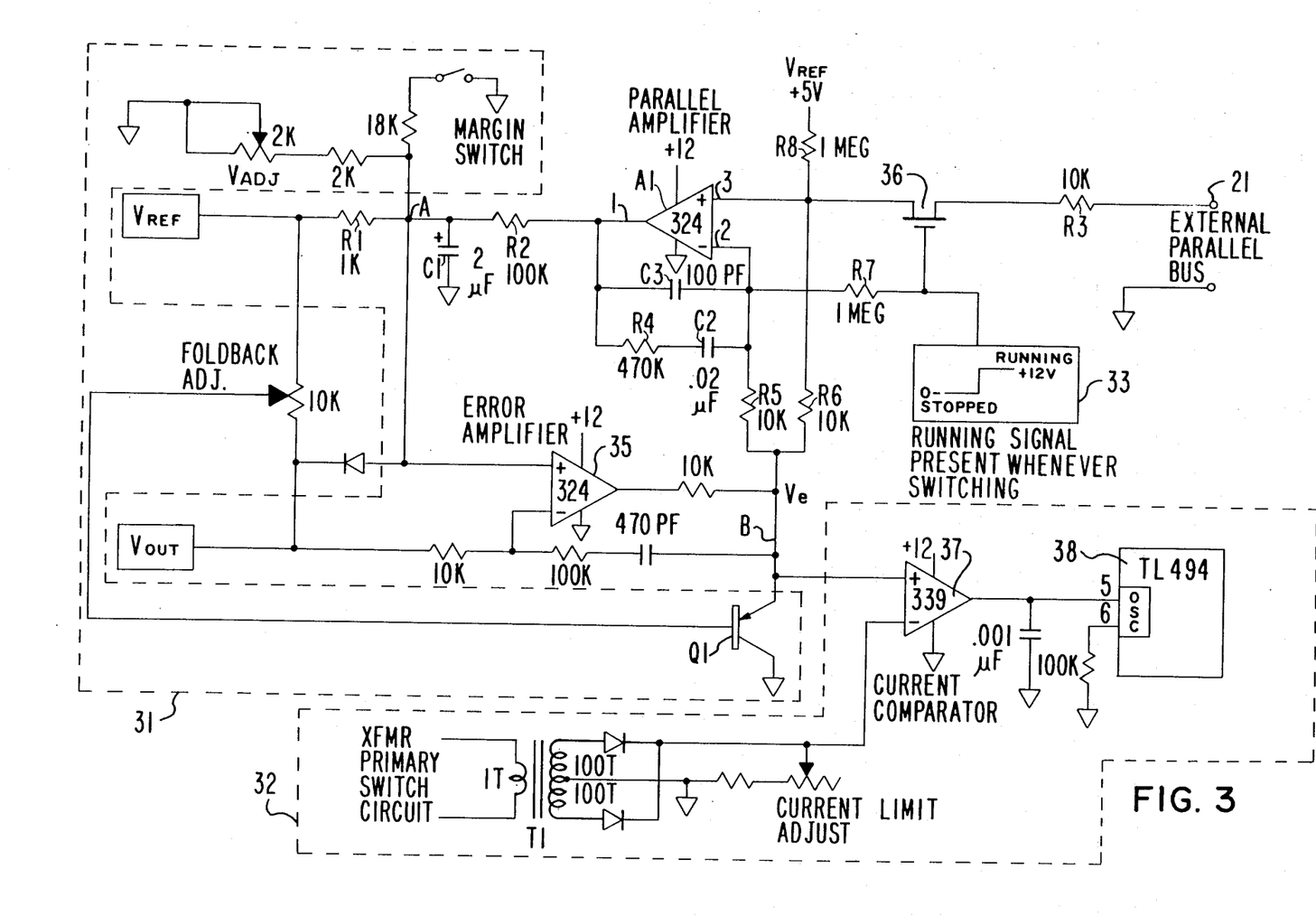
FIG. 3 illustrates a parallel control circuit integrated to form a power supply system using current mode control and a disconnect switch.

FIG. 3 illustrates a parallel control circuit which has been integrated into a power supply system using current mode control and a disconnect switch 36 to disconnect the power supply should the power supply fail. The use of current mode control means that the available error voltage signal ($V_E$) is proportional to the output current from the power supply. This removes the necessity for generating a DC signal such as is generated by current monitor 61 in FIG. 2 for example. Note that as described above in conjunction with FIG. 2, should the parallel control circuit or the power supply connected to the parallel control circuit fail, the other parallel-connected power supplies will continue to run and will be controlled so that each remaining power supply will provide an equal amount of current (albeit a higher current) to the total system. The circuitry of FIG. 3 is essentially the circuit shown in FIG. 2 when the foldback, and voltage adjusting circuitry (not part of this invention) shown in dashed line 31 is removed. Note also that the current mode circuitry shown in dashed lines 32 is described in detail in copending patent application Ser. No. 06/605,524 filed on the same day as this application and this copending application is thus incorporated herein by reference.

The structure of FIG. 3 includes analog switch 36 (typically an FET) which is gated off by removing the gate voltage from its gate should the power supply to which the parallel control circuit of FIG. 3 is connected fail. Switch 36 normally comprises an enhancement mode FET which is normally off in the absence of a gate voltage. The power supply contains an internal signal denoted as "a running signal" (typically this signal varies from zero to twelve volts) which is used to maintain FET switch 36 on. When the power supply fails due to some internal defect, this running signal goes to zero thereby shutting off switch 36. Thus the parallel bus 21 is disconnected from the failed power supply and the system continues to operate but with one less power supply.

The structure of FIG. 3 includes resistor R7 (typically one megohm) to assist during the start up operation of the system to solve a boot strapping problem. During the start up of the system the output voltages $V_{REF}$ and $V_{OUT}$ are both approximately 5 volts (assuming all the other power supplies in the parallel connected system are already running and the power supply shown in FIG. 3 is a replacement power supply being inserted into the system). Thus $V_{OUT}$ and $V_{REF}$ will both be approximately 5 volts and the voltage on node B will be about 5.6 or 5.7 volts reflecting the 5 volts of $V_{REF}$ or $V_{OUT}$ plus the forward bias voltage drop of the emitter-base p-n junction of transistor Q1. The 5.6 volts on node B thus appears on the negative input lead of amplifier A1 as slightly less than 5.6 volts because of the pull down effect of current through resistor R7 being sunk in the running signal source 33 (which produces zero volts during the initial portion of the start up). Therefore the output voltage of amplifier A1 is driven to positive saturation thereby increasing the modified reference voltage to the error amplifier 35 thus increasing the voltage on node B. As the power supply turns on, the running signal will at some instant switch to a +12 volt running signal thereby driving the signal on the negative input lead 2 more positive than the signal on the positive input lead 3 to amplifier A1. At this point the output signal from amplifier A1 goes negative. However, since the other power supplies also have a resistor similar to R7, the running signal merely results in the parallel control circuit of this invention performing in an identical manner to the control circuitry of the other power supplies. If the resistor R7 had not been present and the reference voltage $V_{ref}$ associated with this particular power supply happened to be lower than the reference voltages associated with the other power supplies, the power supply would not turn on. The use of resistor R7 thus avoids this bootstrapping problem.

Figure 5:
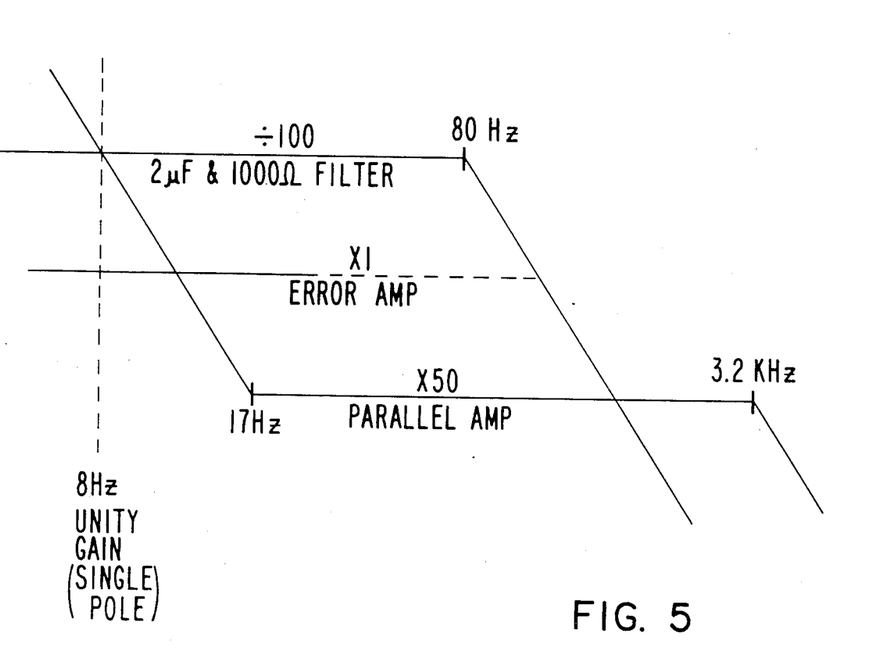
FIG. 5 shows an alternative parallel control circuit for a power supply and a graphical analysis of the control circuit showing that the control circuit is internally stable.
Figure 6:
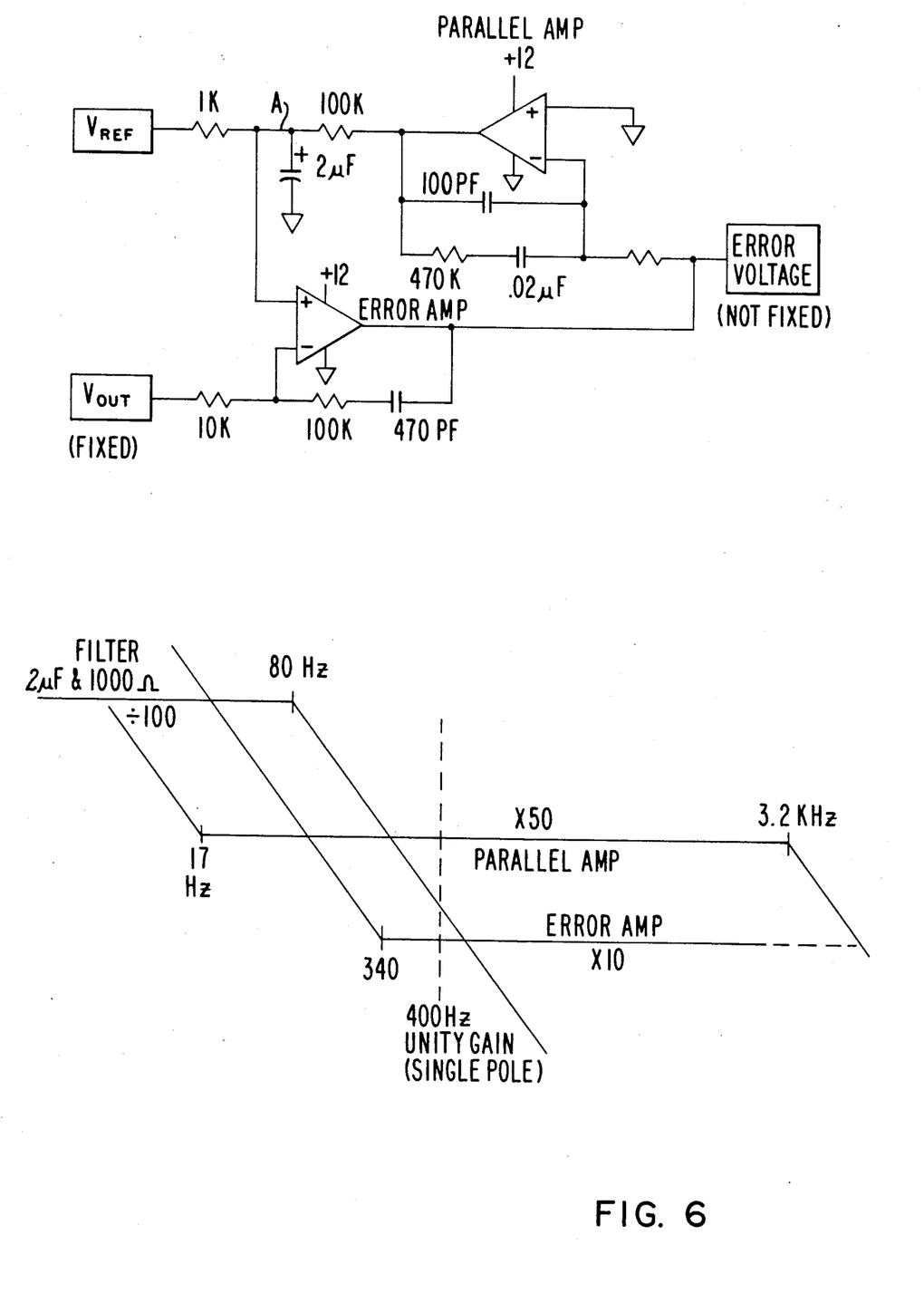
FIG. 6 illustrates the stability of the control circuit of FIG. 5 in a system utilizing two parallel-connected power supplies each using the parallel control circuit of this invention.

FIGS. 5 and 6 illustrate the stability of the parallel control circuit of this invention in combination with a power supply (FIG. 5) or a system containing a plurality of parallel connected power supplies (FIG. 6). As shown in FIG. 5 the circuit is stable because at the unity gain crossover frequency (8 hertz for the component values shown) the circuit offers a single pole response and therefore is stable. In FIG. 6 in the parallel connected configuration with a plurality of power supplies (the parallel connection is not shown for simplicity) the unity gain frequency is at approximately 400 hertz and also exhibits stability. FIG. 6 illustrates the stability of the combination of a plurality of parallel control circuits of this invention in conjunction with a plurality (not shown) of error amplifiers 22 (corresponding to error amplifiers 22 in FIGS. 1 and 2, error amplifier 35 in FIG. 3 and error amplifiers 65 in FIG. 4).

Figure 7:
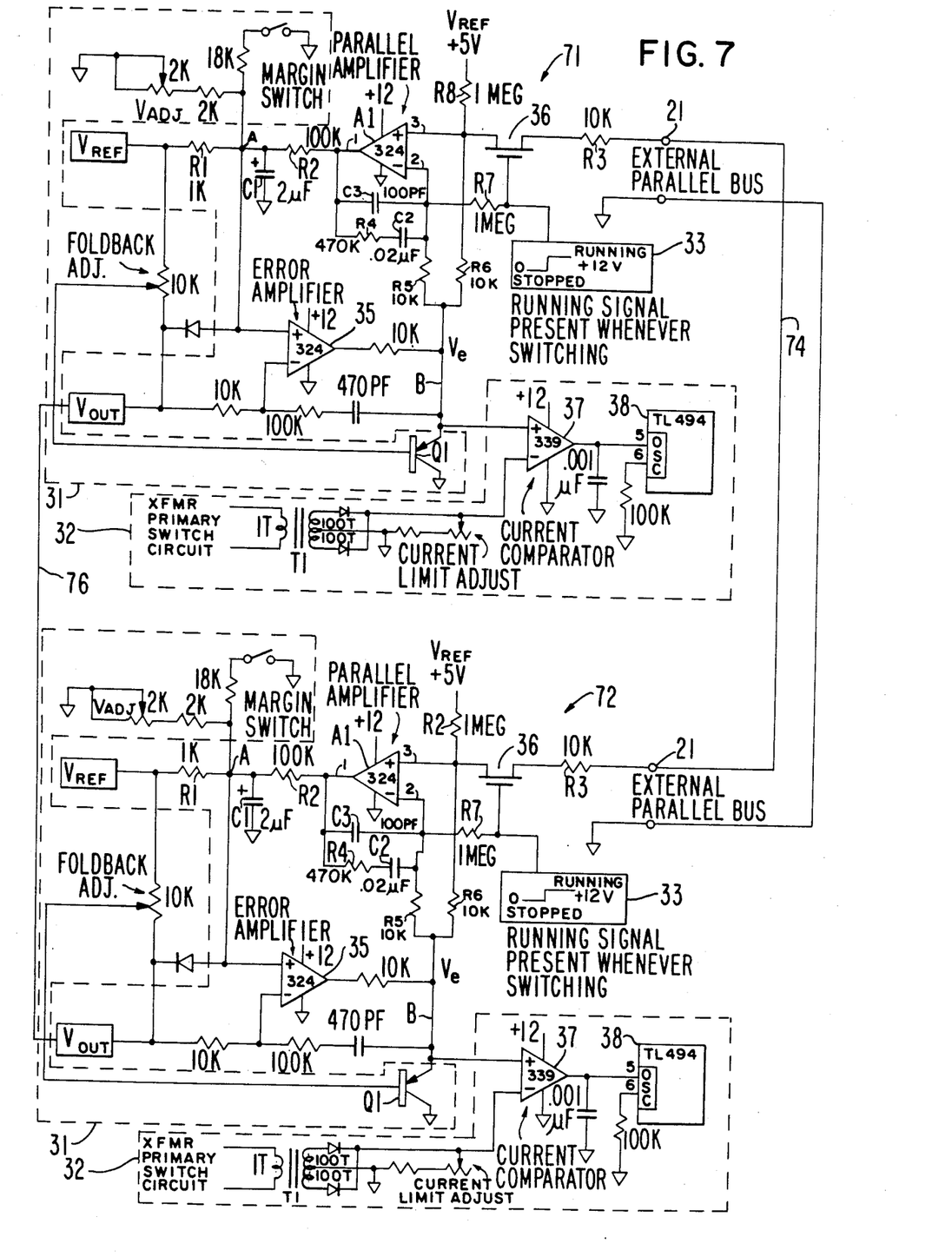
FIG. 7 shows two parallel control circuits of FIG. 3 connected in parallel in a redundant power supply system using two power supplies.

FIG. 7 illustrates the parallel connection of two of the parallel control circuits of the type shown in FIG. 3 when used in conjunction with voltage controlled current mode power supplies. As shown in FIG. 7, lead 37 connects $V_{OUT}$ of each of the two power supplies to which the two parallel control circuits of FIG. 3 are connected while lead 74 comprises the parallel bus. The voltage on bus 74 represents the average current produced by all the parallel connected power supplies. The voltage on bus 76 represents the voltage $V_{out}$ from all power supplies. A deviation in the output current from one power supply from the average output current from both power supplies causes the voltage at node A to deviate from its nominal value. The deviation in the output current from one power supply from the average output current from all power supplies is reflected in a difference between $V_e$ on node B for that one power supply and the voltage on bus 74. Thus, if the output current from the power supply associated with parallel control circuit 71 becomes higher than the average output current, the voltage $V_e$ on node B of parallel control circuit 71 will drop thereby reducing the current compare point in current comparator 76 and thus reducing the peak current through the primary of transformer T1. Each of the parallel control circuits shown in FIG. 7 operates in the same manner and as described above in conjunction with FIG. 3.

In view of the above description, other embodiments of this invention will be obvious to those skilled in the art.

What is claimed:

1. A first power supply adapted to be coupled in parallel with at least one other power supply, said first power supply providing an output voltage at an output terminal, said first power supply comprising:
    a first output lead;
    means for providing a first signal on said first output lead indicative of the output current of said first power supply;
    a lead for receiving a signal indicative of an average of the output current provided by said first power supply and any power supplies coupled in parallel with said first power supply;
    a differential amplifier having a first input lead coupled to said first output lead and a second input lead coupled to said lead for receiving, said differential amplifier providing an error signal indicative of the difference between said output current of said first power supply and said average of the output current;
    means for providing a reference voltage on a reference voltage lead, said reference voltage increasing in response to an increase in the output current of said first power supply;
    means for providing a second voltage having a first component proportional to the voltage at said output terminal of said first power supply and a second component proportional to said error signal; and
    means for providing an adjust signal in response to the difference between said reference voltage and said second voltage, the output current of said first power supply being responsive to said adjust signal, so that if operating in parallel with any other power supplies, said first power supply output current tends to match that of said any other power supplies, but if operating alone, the output voltage of first said power supply tends to remain independent of said first signal.

2. The first power supply of claim 1 further comprising:
    a constant reference voltage lead for receiving a constant reference voltage, said means for providing a reference voltage comprising a voltage divider having a first lead coupled to said constant reference voltage lead and a second lead coupled to said first output lead,
    and wherein said means for providing a second voltage is a voltage divider having a first lead receiving the voltage at said output terminal of said first power supply and a second lead receiving said error signal.

3. The first power supply of claim 2 further comprising a resistor coupled between said first output lead and said lead for receiving.

4. A first power supply adapted to be coupled in parallel with at least one other power supply, said first power supply comprising:
    a first lead for receiving a control signal, said first power supply providing a current in response to said control signal;
    a second lead for receiving a signal indicative of an average of the control signal of said first power supply and said at least one other power supply;
    means for providing an error signal indicative of the difference between said control signal and said signal indicative of said average of the control signal;
    means for providing a reference voltage, said reference voltage varying in response to said error signal; and
    means for generating said control signal, said control signal being determined by the difference between the voltage at the output terminal of said first power supply and said reference voltage.

5. The first power supply of claim 4 wherein said means for providing a reference voltage comprises:
    a third lead for receiving a constant reference voltage; and
    a voltage divider having a lead connected to said third lead and a lead receiving said error signal.

6. A first power supply adapted to be coupled in parallel with at least one other power supply, said first power supply comprising:
    a lead for receiving a first signal indicative of an average of the output current of said first power supply and said at least one other power supply;
    current output means for providing a second signal on a current output means lead indicative of the output current of said first power supply;
    comparator means having a first input lead coupled to said lead for receiving and a second input lead coupled to said current output means lead for providing an error signal indicative of the difference between the signals at said first and second input leads;
    means for receiving a reference voltage;
    means for causing said first power supply to provide an output current responsive to said error signal and the difference between said reference voltage and the voltage at the output terminal of said first power supply; and start means for causing said first power supply to provide output current during a time period after said first power supply is turned on, whether said reference voltage is greater or less than the voltage at the output terminal of said first power supply and whether the output current of said first power supply is greater or less than said average of the output current.

7. The first power supply of claim 6 wherein said start means provides a start signal on a start means output lead, said start means output lead being resistively coupled to said second input lead of said comparator means, said start signal being at a first voltage during said time period sufficient to cause said error signal to assume a value causing said first power supply to provide output current, said start signal being at a second voltage after said time period wherein said error signal assumes a value so that the output current of said first power supply is responsive to the difference between said reference voltage and the voltage at the output terminal of said first power supply and the difference between said first signal and said second signal.

8. A first power supply adapted to be coupled in parallel with at least one other power supply, said first power supply comprising:
   a first lead for receiving a control signal, the amount of power delivered by said first power supply being determined by said control signal;
   a second lead for receiving a signal indicative of an average of the control signal of said first power supply and said at least one other power supply;
   means for providing an error signal indicative of the difference between said control signal and said signal indicative of said average of the control signal;
   means for generating said control signal in response to the difference between the output voltage of said first power supply and a reference signal, said control voltage also being responsive to said error signal, thereby tending to equalize the amount of power delivered by said first power supply and said at least one other power supply.

9. A first power supply adapted to be coupled in parallel with at least one other power supply, said first power supply comprising:
   a first lead for receiving a first signal indicative of the output current of said first power supply;
   a second lead for receiving a signal indicative of an average of the output current of said first power supply and said at least one other power supply, said second lead being resistively coupled to said first lead;
   comparator means having first and second comparator input leads coupled to said first and second leads, respectively, said comparator means providing an error signal indicative of the difference between the signal supplied to said first and second comparator input leads from said first and second leads, the output current of said first power supply being responsive to said error signal; and
   switch means for decoupling said second lead from said first lead in response to said first power supply failing.

10. The first power supply of claim 8 further comprising:
    a third lead for receiving a signal indicative of the amount of current provided by said first power supply; and
    means for comparing said control signal to said signal indicative of the amount of current, said first power supply shutting off the output current of said first power supply in response to the output signal of said means for comparing.

* * * * *